2,795,484
Patented June 11, 1957

2,795,484

PROCESS FOR THE MANUFACTURE OF DEFLUORINATED PHOSPHATIC MATERIAL

Ira Milton Le Baron, Evanston, Ill., assignor to International Minerals & Chemical Corporation, a corporation of New York No Drawing. Application February 12, 1954, Serial No. 410,021

4 Claims. (Cl. 23—108)

This invention relates to defluorinated phosphatic materials. More particularly it relates to an improved method of manufacturing available phosphatic animal feed supplement products of low fluorine content.

The fluorine content of phosphatic rock in the different areas in which the rock occurs varies, but seldom is low enough to permit the use of the rock as animal feed supplement material without subjecting the rock to some purification steps.

Purification steps in general have revolved around heat treatments, chemical treatments or combinations thereof. Shoeld 2,288,112, for example, shows a process for defluorinating superphosphate which comprises mixing superphosphate with sulfuric acid and heating the mixture to a temperature of incipient $SO_3$ fumes. Another proposal advanced for defluorinating phosphatic material is that a mixture of phosphate rock and phosphoric acid be calcined at a temperature below that at which the mixture fuses, i. e., at temperatures not in excess of about 2700° F.

Such processes all suffer from the disability of using a high temperature, producing a relatively low $P_2O_5$ content material and producing a material of low availability. By available as used herein is meant that the phosphate is in the orthophosphate state or an equivalent state such as is found in betatricalcium phosphate in which states the phosphate can be assimilated by an animal.

It is an object, therefore, of the present invention to overcome the shortcomings and disadvantages of processes heretofore in use.

It is a further object of this invention to produce phosphatic animal feed supplement materials of extremely low fluorine content.

It is a further object of this invention to produce a defluorinated phosphatic animal feed material of relatively high orthophosphate $P_2O_5$ content.

It is a further object of this invention to produce animal feed supplements containing the $P_2O_5$ content in an available form.

These and other objects of the invention will become apparent to those skilled in the art from the following description.

Briefly, in the process of the instant invention a comminuted tricalcium phosphate material such as phosphate rock or phosphate ore is treated with sulfuric acid and the mixture calcined. The calcined material is mixed by mechanical means with relatively pure phosphoric acid whereby the reacted material produces a high $P_2O_5$ orthophosphate content and the final mixture is dried to a low moisture content under conditions which prevent any substantial production of pyrophosphoric acid constituents.

Preparatory to the heat treatment the phosphate rock is ground generally to a particle size of about 90 to about 100 mesh. Sulfuric acid and the ground phosphate rock are introduced into a mixer in a ratio of about 1000 parts of rock to between about 450 and about 750 parts by weight of 98% sulfuric acid.

During the mixing operation some fluorine is volatilized. After mixing, the mixture is subjected to tumbling action in a rotary drum in which solids can pass concurrently but preferably pass in countercurrent flow to hot gases. The calcining temperature for the solids is between about 1000° F. and about 2700° F. No fusion should be permitted to occur during this calcining operation. For example, lower calcining temperatures must be maintained with Tennessee phosphate rock than with Florida pebble phosphate.

Defluorination during calcination is enhanced by the sweeping action of gases passing over and through the comminuted solids. One constituent of such gases which adds materially to the defluorination is water vapor.

Heat treated mixtures of rock and sulfuric acid in general show a $P_2O_5$ content in the range of about 30% to about 42%, the $P_2O_5$ content varying directly with the grade of the rock fed to the acid mixing operation. To such heat treated mixtures is added sufficient phosphoric acid to produce a specified grade of product, i. e., 18% elemental phosphorus, 20% elemental phosphorus, and the like; the quantity of phosphatic acid required to produce a specified grade above that of the heat treated mixture increasing as the $P_2O_5$ content of the heat treated mixture decreases when taken on a bone dry product basis, and generally requires between about 200 and about 500 parts by weight of $H_3PO_4$ per each 1000 parts by weight of defluorinated mix. For economical reasons it is preferable to employ an acid of a concentration as high as possible. An 85% phosphoric acid is preferred, but phosphorus acids of 60% to 75% concentration, i. e., technical grades of low fluorine content, have been successfully used.

In order to secure a complete and uniform reaction, the defluorinated acid-mix is mixed in either wet or dry form with phosphatic acid under agitation conditions. It has been found that there is some improvement in the uniformity of reaction if the defluorination mix is prewetted with a small amount of water before adding in concentrated phosphoric acid. In the mixing operation it is desirable to limit the total water content to less than about 15% to 20% to avoid formation of soupy mixtures which upon drying exhibit hard lumpy structure. Such mixing of acid and defluorinated material may be carried out in pug mills, so-called pony type mixers and the like.

The reacted mixtures of phosphoric acid and defluorinated materials are dried at temperatures in the range of about 90° C. to about 150° C., and preferably in the range of about 105° C. to about 130° C. Temperatures below about 135° C. are preferred because drying at these temperatures produces less pyrophosphoric compounds, i. e., less unavailable material. Prior to drying, the solids may be wetted and tumbled to effect granulation.

The process will be more fully understood from the following examples which are given by way of illustration and without any intention of the invention being limited thereto.

Example 1

Florida flotation grade phosphate of 77% B. P. L. is ground to a particle size of 85% through a 200 mesh standard screen. This ground phosphate is mixed with sulfuric acid of a concentration of approximately 53° Bé. in the ratio of approximately 1000 pounds of rock to approximately 600 pounds of acid calculated as 100% sulfuric acid. The thoroughly mixed material which is a puddled mass is then stored and cured as is standard practice in the manufacture of superphosphate. Cured acid-rock mix was passed through a rotary kiln 5 feet in diameter and 80 feet in length. The solids flowed through this kiln countercurrent to hot gases which heated the solids to a temperature of approximately 2600° F. Solids were held at this temperature for between about 10 and about 15 minutes, cooled and then stored.

The calcined solids analyzed as follows:

| | Percent |
|---|---|
| CaO | 50.9 |
| $P_2O_5$ | 37.6 |
| Fluorine | 0.13 |
| $Al_2O_3$ | 1.23 |
| $Fe_2O_3$ | 1.54 |
| $SO_4$ | 4.34 |
| Water | 0.4 |

The calcined solids were ground to a size permitting 100% to pass through a 65 mesh standard screen. These ground and calcined solids were introduced into a Ross pony-type batch mixer and 26 parts of water per 1000 parts of solids were added thereto for wetting purposes. To this prewetted mixture was added 85.4% phosphoric acid in the proportions of approximately 1000 parts of solids to approximately 205 parts of phosphoric acid. The reacted mixture was dried in a heated oven at a temperature of approximately 105° C. for 17 hours. The dry product analyzed approximately 18.1% elemental phosphorus and approximately 1.4% moisture.

*Example II*

Florida flotation grade phosphate of approximately 75% B. P. L. was ground to a particle size of 85% passing through a 200 mesh standard screen.

Ground phosphate was mixed with sulfuric acid of approximately 55° Bé. in the ratio of approximately 1000 pounds of phosphate rock to approximately 575 pounds of acid calculated as 100% sulfuric acid. The acid-mix is formed as a puddling mass, then stored and cured as is standard practice in the manufacture of ordinary superphosphate.

Cured rock-acid mix was passed through a rotary kiln 5 feet in diameter and 80 feet in length. The solids flowed countercurrent to hot gases containing water vapor which heated the solids to a temperature of approximately 1500° F. Solids may be defluorinated by holding at this temperature for approximately 20 minutes and then cooling the heat treated material. These calcined solids analyzed approximately 31.8% $P_2O_5$ and approximately 0.15% fluorine. As in Example I, the solids were ground to a particle size of approximately 100% passing through a 65 mesh standard screen.

The ground solids were introduced into a Ross pony batch type mixer and approximately 110 parts by weight of water per 1000 parts by weight ground solids were added with agitation. To this prewetted solids material was added approximately 440 parts of 75% C. P. phosphoric acid. The mixture was agitated for approximately 10 minutes to permit time for completion of the reaction, at which time the resultant wet mixture had a moisture content of approximtaely 10.4% by weight. This wet mass was dried for 48 hours in an electric oven held at approximately 105° C. The dry solids analyzed 19.24% elemental phosphorus and approximately 1.6% moisture.

To test the availability to animals of the phosphorus in the products of Examples I and II, chickens were fed diets as follows.

A basic premix was prepared consisting of:

| | Percent |
|---|---|
| Cornstarch | 64 |
| Blood fibrin | 20 |
| Gelatin | 4 |
| Ground cellulose | 3 |
| Wilson's liver fraction L | 1 |
| Hydrogenated vegetable fat | 3 |

To this basic premix were added vitamins and minerals to make a diet which by established constituent levels is nutritionally adequate with the exception of phosphorus and calcium. Diets were prepared by adding sufficient amounts of each of the calcined acid-rock mixture, betatricalcium phosphate (19.4% P.), the product of Example I and the product of Example II to portions of the basic mix. The additions were made of the various phosphates respectively to a portion of the basic mix in amounts to give an elemental phosphorus content in the diet of 0.25% and 0.35% phosphorus. Rations containing each level of phosphorus are fed to separate lots of chicks. The chicks are given the diet ad libitum beginning when they are one day old. Feeding is continued for three to four weeks. After this period the chicks are weighed individually and the animals sacrificed. The left tibia of each sacrificed animal is removed, cleaned of adhering flesh and extracted with fat solvent, i. e., ethanol and ethyl ether respectively, over a period of 20 to 24 hours. After the fat extraction operation the bone is dried and weighed. Following drying the bone is ashed in a muffle furnace to constant weight, percent being expressed as percent fat free dry bone. In the instant case knowing the phosphoric content of each of the added materials defluorinated superphosphate 13.97%, betatricalcium phosphate being 19.4%, product of Example I having 18.1% phosphorus and the product of Example II having 19.24% phosphorus; the amounts added and the availability determined are shown in the following chart.

| Material | 0.25% Phosphorus | 0.35% Phosphorus | Biological Values |
|---|---|---|---|
| | Grams | Grams | Percent |
| Defluorinated Acid Rock Mix | 1.8 | 2.5 | 53 |
| Betatricalcium Phosphate | 1.29 | 1.8 | 100 |
| Product of Example I | 1.38 | 1.93 | 99 |
| Product of Example II | 1.3 | 1.82 | 102 |

It will be seen that by a plot of the points of which 0.25 and 0.35 are only two points on the curve, said plot having percent phosphorus in the diet as the ordinate against percent bone content as the abscissa, that a comparison is determined of the amount of phosphate needed to obtain the same degree of calcification which degree of calcification bears a direct relationship to the relative availability of the elemental phosphorus. In all of the biological assay work betatricalcium phosphate is used as the standard of comparison. From the above chart it will be seen that the availability of the products prepared in accordance with applicant's process is substantially identical with the pure product, betatricalcium phosphate.

Having thus fully described and illustrated the character of the invention, what is desired to be secured and claimed by Letters Patent is:

1. A process for the manufacture of a substantially fluorine-free calcium phosphate composition useful in animal feeds wherein substantially all of the calcium and phosphorus are available for assimilation by animals, which comprises mixing comminuted tricalcium phosphate material containing combined fluorine with sulfuric acid, about 450 to about 750 parts by weight of $H_2SO_4$ being employed for each 1000 parts by weight of said tricalcium phosphate material, calcining the mixture so produced in contact with a current of gas containing water vapor at a temperature requisite to evolve the fluorine and sulfur substantially completely therefrom, said temperature being below the fusion temperature and in the range of about 1000 to about 2700° F., commingling the calcined material with phosphoric acid in the ratio of about 200 to about 500 parts by weight of $H_3PO_4$ for each 1000 parts by weight of said calcined material, and heating the resulting mixture to a temperature between about 90 and about 150° C. to produce a calcium phosphate product having an assimilability when incorporated in animal feeds approximating that of beta-tricalcium phosphate.

2. The process of claim 1 wherein said tricalcium phosphate material is a phosphate ore.

3. The process of claim 1 wherein said mixture of said calcined material and phosphoric acid is heated at a temperature above about 90° C. and below about 135° C., whereby a calcium phosphate product is obtained having an assimilability when incorporated in animal feeds of at least about 99% that of beta-tricalcium phosphate.

4. The process of claim 1 wherein said calcined material, prior to being commingled with phosphoric acid, is prewetted with water in such an amount that the total water content in the mixing operation is less than about 20%, and the mixture of calcined material, water, and phosphoric acid is heated and dried at a temperature between about 105 and about 130° C.

References Cited in the file of this patent

UNITED STATES PATENTS

| | | |
|---|---|---|
| 995,028 | Newberry et al. | June 13, 1911 |
| 1,637,428 | Rupp | Aug. 2, 1927 |
| 1,994,070 | Foss | Mar. 12, 1935 |
| 2,288,112 | Shoeld | June 30, 1942 |
| 2,328,884 | Shoeld | Sept. 7, 1943 |
| 2,504,545 | Waring et al. | Apr. 18, 1950 |
| 2,565,351 | Butt | Aug. 21, 1951 |